(12) United States Patent  (10) Patent No.: US 7,349,201 B2
Tatsukami et al.  (45) Date of Patent: Mar. 25, 2008

(54) ELECTRONIC APPARATUS

(75) Inventors: Ikki Tatsukami, Kawasaki (JP);
Minoru Kumagai, Kawasaki (JP);
Yutaka Satou, Kawasaki (JP); Takashi Iijima, Kawasaki (JP); Tadashi Kikkawa, Shimane (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/265,232

(22) Filed: Nov. 3, 2005

(65) Prior Publication Data

US 2006/0056143 A1 Mar. 16, 2006

Related U.S. Application Data

(63) Continuation of application No. PCT/JP03/05881, filed on May 12, 2003.

(51) Int. Cl.
*G06F 1/16* (2006.01)
(52) U.S. Cl. .............. 361/683; 429/100; D14/314; D14/336
(58) Field of Classification Search ........... 361/683, 361/728; 429/100; D14/314, 336, 337
See application file for complete search history.

(56) References Cited

U.S. PATENT DOCUMENTS

| | | | | |
|---|---|---|---|---|
| 5,058,045 A | * | 10/1991 | Ma | 361/683 |
| 5,159,528 A | * | 10/1992 | Murphy | 361/683 |
| 5,200,883 A | * | 4/1993 | Kobayashi | 361/683 |
| 5,455,737 A | * | 10/1995 | Ogami et al. | 361/680 |
| 5,506,749 A | * | 4/1996 | Matsuda | 361/683 |
| 5,592,362 A | | 1/1997 | Ohgami et al. | |
| 5,649,750 A | * | 7/1997 | Ishii et al. | 312/223.2 |
| 5,738,536 A | | 4/1998 | Ohgami et al. | |
| 5,905,632 A | * | 5/1999 | Seto et al. | 361/683 |
| 6,102,721 A | | 8/2000 | Seto et al. | |
| 6,108,716 A | | 8/2000 | Kimura et al. | |
| 6,191,938 B1 | | 2/2001 | Ohgami et al. | |
| 6,233,141 B1 | * | 5/2001 | Lee et al. | 361/683 |
| 6,256,192 B1 | * | 7/2001 | Shannon | 361/683 |
| 6,373,693 B1 | | 4/2002 | Seto et al. | |
| 6,381,129 B1 | * | 4/2002 | Shimada et al. | 361/683 |
| 6,593,859 B1 | * | 7/2003 | Watanabe | 341/20 |
| 6,628,506 B2 | * | 9/2003 | Landry et al. | 361/680 |

(Continued)

FOREIGN PATENT DOCUMENTS

CN 2246822 Y 2/1997

(Continued)

OTHER PUBLICATIONS

Chinese Office Action dated Mar. 2, 2007, Application No. 03826444.7.

*Primary Examiner*—Lisa Lea-Edmonds
(74) *Attorney, Agent, or Firm*—Westerman, Hattori, Daniels & Adrian, LLP.

(57) ABSTRACT

The present invention relates to an electronic apparatus having: a base section to be placed on a flat surface such as the top of a desk; a standing section standing on the base section; an open/close section rotatably supported by the standing section and openable/closable with respect to the standing section; and an electronic circuit incorporated therein. The present invention aims to achieve appropriate distribution of weight. The base section has a battery-pack storing section that stores a battery pack for supplying power to the electronic circuit of the electronic apparatus.

11 Claims, 9 Drawing Sheets

U.S. PATENT DOCUMENTS

| | | | |
|---|---|---|---|
| 6,654,234 B2 * | 11/2003 | Landry et al. | 361/681 |
| 6,724,616 B2 * | 4/2004 | Kuo et al. | 361/683 |
| 6,816,365 B2 * | 11/2004 | Hill et al. | 361/683 |
| 6,822,851 B2 * | 11/2004 | Yukawa et al. | 361/683 |
| 6,865,075 B2 * | 3/2005 | Oakley | 361/683 |
| 2003/0151888 A1 * | 8/2003 | Chien et al. | 361/683 |

FOREIGN PATENT DOCUMENTS

| | | |
|---|---|---|
| CN | 2391240 Y | 8/2000 |
| JP | 04-123213 | 4/1992 |
| JP | 07-230343 | 8/1995 |
| JP | 7-230343 A | 8/1995 |
| JP | 08-076894 | 3/1996 |
| JP | 8-76894 A | 3/1996 |
| JP | 09-006487 | 1/1997 |
| JP | 9-6487 A | 1/1997 |
| JP | 10-011189 | 1/1998 |
| JP | 10-133772 | 5/1998 |
| JP | 11-212665 | 8/1999 |
| JP | 11-327704 | 11/1999 |
| JP | 11-327704 A | 11/1999 |
| JP | 2001-125671 | 5/2001 |
| JP | 2001-125671 A | 5/2001 |
| JP | 2001-175356 | 6/2001 |
| JP | 2001-175356 A | 6/2001 |
| JP | 2001-236144 | 8/2001 |
| JP | 2001-236144 A | 8/2001 |

* cited by examiner

ELECTRONIC APPARATUS

This application is a continuation of international application PCT/JP2003/005881 filed on May 12, 2003.

TECHNICAL FIELD

The present invention relates to an electronic apparatus having: a base section to be placed on a flat surface such as the top of a desk; a standing section standing on the base section; an open/close section rotatably supported by the standing section and openable/closable with respect to the standing section; and an electronic circuit incorporated therein.

BACKGROUND ART

Conventionally, various types of electronic apparatus have been developed and become widespread. As an example of such devices, personal computers (hereinafter refer to as "PC") having a data processing function will be described here.

In addition to desktop PCs, notebook PCs are widely used as PCs. The desktop PCs are each composed of: a main unit performing data processing, which is equipped with a CPU, a hard disk, etc.; an image display unit having a screen for displaying images; and a keyboard used for key operation, which are disposed in separate respective housings. The notebook PCs are portable and each composed of: an image display unit having a display screen; and a main unit having a CPU performing data processing, a hard disk for storing information, and the like incorporated therein, and having arrayed keys on the top to serve also as a keyboard. The image display unit and the main unit of the notebook PCs are connected via hinges.

The notebook PCs can be folded in two by superposing the image display unit and the main unit via hinges and thus it is convenient to carry. In addition, the notebook PCs can be unfolded by making the image display unit and the main unit open with respect to each other so that a user can operate keys while looking at the display screen, and thus it has excellent operability.

Because importance is placed on portability and thin structure in a folded state, the performance of the notebook PCs is considerably sacrificed in terms of functions compared to the desktop PCs. In addition, since the notebook PCs are usually used like a desktop PC in many cases, i.e. they are placed on a desk and used without being carried, recent years have seen the emergence of integral-type PCs having full functions and portability to some extent although the portability is not as high as that of notebook PCs. Typically, the integral-type PCs are each composed of: a base section to be placed on a flat surface like the top of a desk; a standing section standing on and supported by the base section and having a display screen; and a keyboard connected to the standing section via hinges and openable and closable with respect to the standing section. In the integral-type PCs, when not in use, the keyboard can be made stood against the standing section in such a manner as to be superposed on the standing section so that space on the desk can be obtained. In addition, the integral-type PCs are easy to carry because they are integrally configured.

Many of such notebook PCs and integral-type PCs have hinges as described above, and it is ensured that these computers are housed in a compact manner when not in use and that they are convenient to carry (refer to Patent Documents 1 and 2, for example).

In the notebook PCs, components heavy in weight such as hard disk, CD drive, etc. are disposed in a main unit having a keyboard on the top. Also, the notebook PCs are so configured as to have a heavy battery pack loaded in the main unit because importance is placed on portability (refer to Patent Document 3, for example). Loading a battery pack enables the notebook PCs to operate for a while as long as power remains in the battery even when AC power is not available.

In contrast, although the integral-type PCs may also be so configured as to have a battery pack loaded therein like the notebook PCs to improve its portability, this is not preferable for the following reason. In the integral-type PCs, if a battery pack is loaded in its housing having the keyboard like the notebook PCs, the keyboard that is folded to stand against the standing section becomes heavy in weight, which leads to a situation where it is difficult to perform open/close motions and to keep the PC stable in a closed position. There has been devised and proposed a notebook PC whose central position does not shift even if it is opened and closed (refer to Patent Document 4, for example). However, the proposed notebook PC requires a special mechanism, therefore resulting in complicated mechanisms, which is contrary to the demand for packing of functions, downsizing, and weight reduction.

(Patent Document 1)
Japanese Patent Application Publication No. 10-11189
(Patent Document 2)
Japanese Patent Application Publication No. 11-212665
(Patent Document 3)
Japanese Patent Application Publication No. 4-123213
(Patent Document 4)
Japanese Patent Application Publication No. 10-133772

In view of the above circumstances, an object of the present invention is to provide an electronic apparatus such as an integral-type PC whose weight is appropriately distributed.

DISCLOSURE OF THE INVENTION

An electronic apparatus of the present invention which achieves the above object is an electronic apparatus having a base section to be placed on a flat surface, a standing section standing on the base section, an open/close section rotatably supported by the standing section and openable/closable with respect to the standing section, and an electronic circuit incorporated therein, wherein:

the base section has a battery-pack storing section that stores a battery pack for supplying power to the electronic circuit.

The electronic apparatus of the present invention weights the base section by storing the battery pack in the base section, and thus components can be arranged in consideration of operability and design. For example, by disposing a CD/DVD accessing drive that is heavy to some extent in the standing section, easy operation by a user such as loading or removal of a CD or DVD can be realized.

The electronic device in such an arrangement can also be carried to anywhere desired and used without depending on AC power.

In the above electronic apparatus according to the present invention, preferably, the battery-pack storing section is a hollow on the undersurface of the base section to be placed on the flat surface.

Although there is no need to frequently change the battery pack once it is loaded, the battery pack that is considerably heavy in weight needs to be handled when it is changed.

When the battery pack is so configured as to be loaded in and removed from the undersurface of the base section, it can be readily changed. In addition, since the undersurface of the base section is invisible because it is placed on a flat surface when being used, it is possible to improve the design of the upper and side portions of the base section which are visible.

Further, in such an arrangement where the battery pack is to be loaded from the undersurface of the base section, preferably, the undersurface is flush with the battery pack stored in the battery-pack storing section.

Such an arrangement can make the base section compact and sit on the flat surface more stably because there is no need to provide a cover for covering the battery-pack storing section.

Furthermore, in the electronic apparatus according to the present invention, preferably, the standing section has a display screen on its front, with respect to which the open/close section is adapted to be opened and closed. In this arrangement, preferably, the standing section is capable of adjusting an elevation angle of the display screen by being rotatably supported by the base section, and the standing section may have an operational circuit disposed on a back of the display screen.

Still further, preferably, the open/close section is rotatably supported by the standing section between a closed position in which the open/close section superposes the display screen and an open position in which the open/close section is opened with respect to the display screen.

The open/close section may be a keyboard having arrayed keys to receive manipulations of an operator.

BEST MODE FOR CARRYING OUT THE INVENTION

An embodiment of the present invention will be described below.

Descriptions will be given here of the above-described integral-type PC as an embodiment of the electronic apparatus of the present invention.

Figure 1:
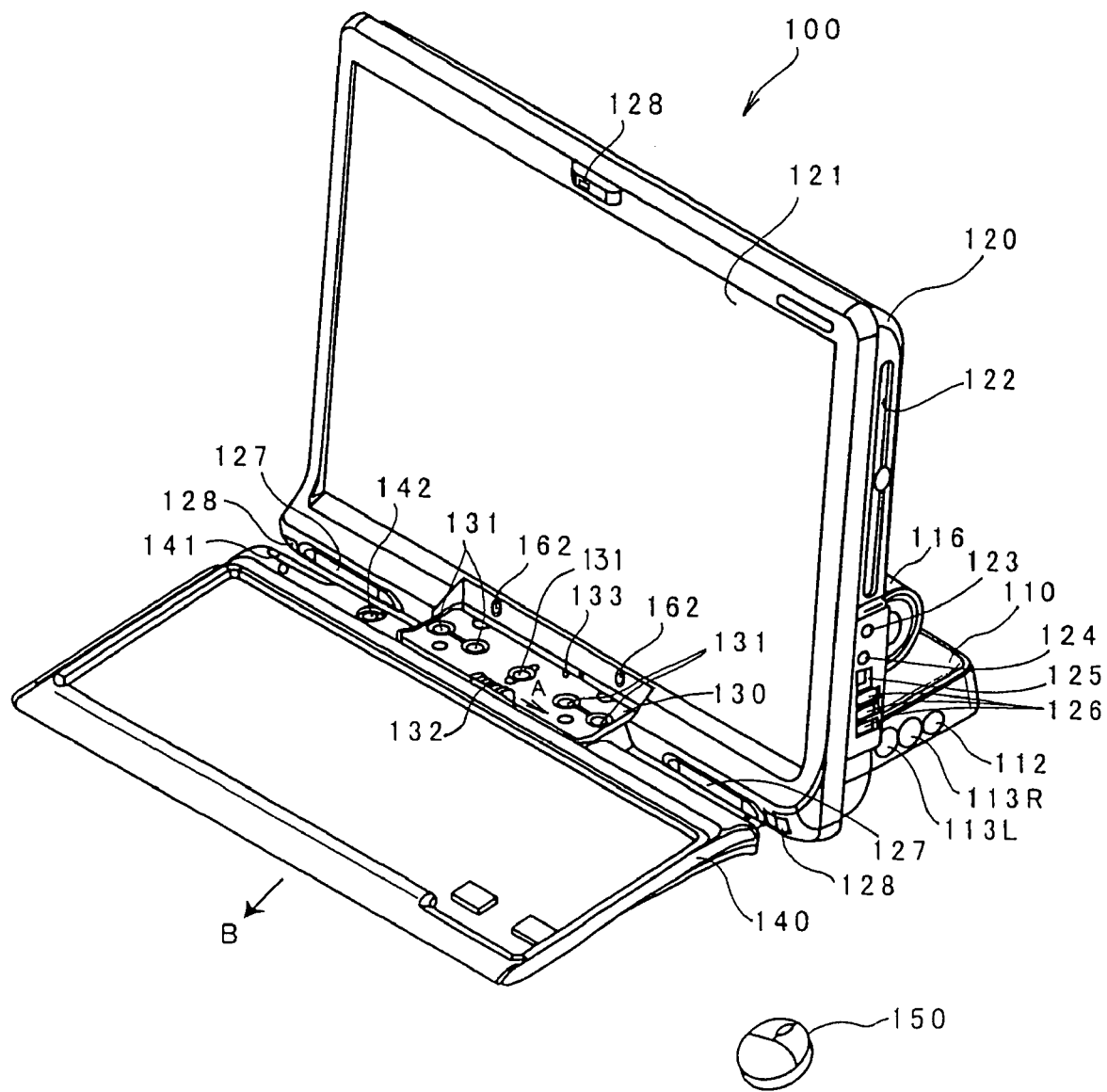
FIG. 1 is a perspective view showing the appearance of an integral-type PC as an embodiment of the electronic apparatus of the present invention in an open position.
Figure 2:
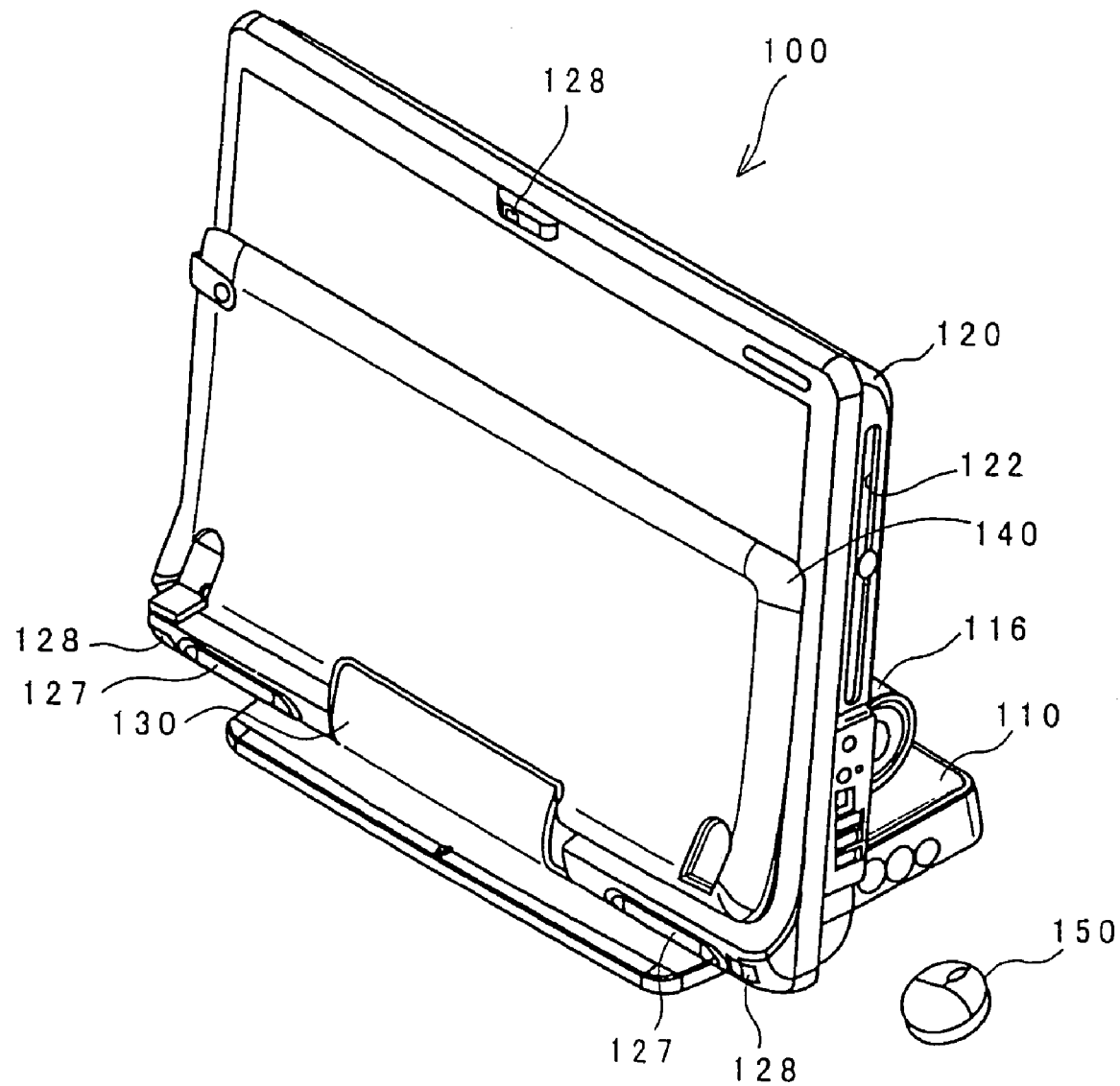
FIG. 2 is a perspective view showing the appearance of an integral-type PC as an embodiment of the electronic apparatus of the present invention in a closed position.

FIGS. 1 and 2 are perspective views showing the appearance of an integral-type PC as an embodiment of the electronic apparatus of the present invention, in an open position and a closed position, respectively.

This integral-type PC 100 is composed of a base section 110, a standing section 120, a hinge unit 130, a keyboard 140, and a mouse 150.

Figure 8:
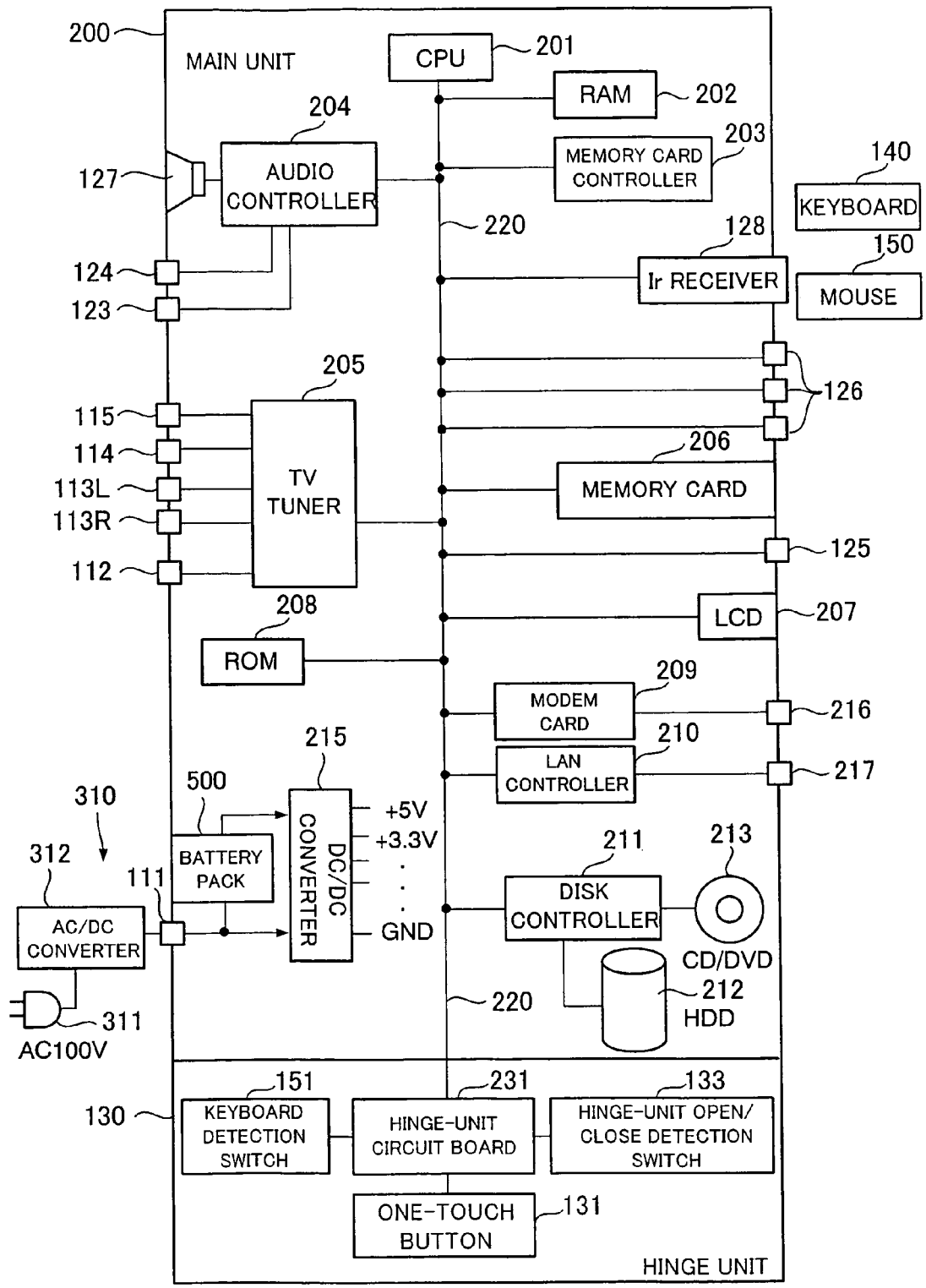
FIG. 8 is a circuit block diagram of the integral-type PC.

The base section 110 is a portion that becomes a base to be placed on a horizontal surface like the top of a desk etc. The base section 110 is equipped with a battery pack to be loaded (see FIG. 8 which will be described later). As shown in FIG. 8, the base section 110 is provided with an AC adapter connection terminal 111, an antenna input terminal 112 connected to a TV antenna, audio input terminals 113R and 113L, an S video input terminal 114, and a video input terminal 115. Furthermore, a woofer 116 is provided in an upper part of the base section 110.

The standing section 120 is, as illustrated, supported on the base section 110 in a standing manner, and the standing section 120 has a liquid crystal display screen 121 in the front thereof. The shaft of the standing section 120 is rotatably supported on the base section 110 to permit rotation through an angle so that an elevation angle of the liquid crystal display screen 121 can be adjusted. Also, the standing section 120 is equipped with a principal part of data processing to function as a computer, such as a CPU and a hard disk, on the back surface side of the display screen 121. What is externally shown in FIG. 1 includes a CD/DVD loading slot 122 through which a CD and a DVD are loaded, a headphone output terminal 123 into which a headphone jack is inserted, a microphone input terminal 124 into which a microphone jack is inserted, a connector terminal 125 into which the connector of a communication cable which conforms to IEEE 1394 Communication standards is inserted, three connector terminals 126 into which the connectors of communication cables in conformance with USB Communication Standards, two right and left speakers 127, and a total of three infrared receivers 128, one each in the right and left lower parts and one in the upper part. These infrared receivers 128 receive infrared rays for communication, which are emitted from the keyboard 140 and the mouse 150, which will be described later.

The hinge unit 130 is provided with five one-touch buttons 131, and the hinge unit 130 incorporates a circuit board on which circuits for detecting the operations of these one-touch buttons 131 and transmitting them to the standing section are loaded.

Functions, such as startup of an Internet program upon depressing of a certain one-touch button, can be respectively allocated to these five one-touch buttons 131.

The hinge unit 130 removably supports the keyboard 140, and the hinge unit 130 is provided with a demounting operation button 132 used to demount the keyboard 140 mounted on the hinge unit 130 from the hinge unit 130.

Figure 3:
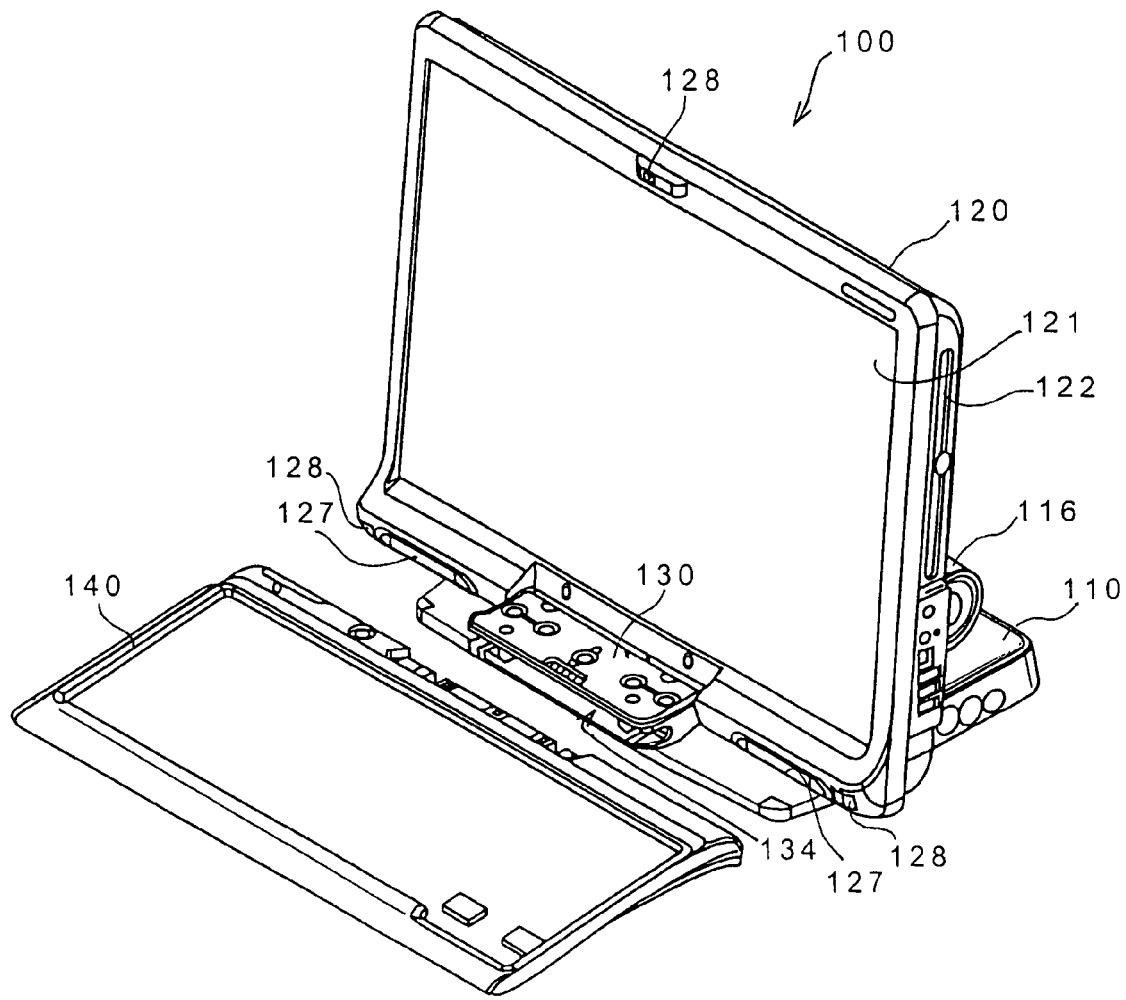
FIG. 3 is a perspective view of a keyboard demounted from a hinge unit.

FIG. 3 is a perspective view of the keyboard 140 demounted from the hinge unit 130.

A keyboard biting slit 134, which extends right and left and bites the keyboard 140, is formed in the hinge unit 130 as shown in FIG. 3. When the keyboard 140 in the posture as shown in FIG. 3 is fitted into the keyboard biting slit 134 of the hinge unit 130, the keyboard 140 becomes mounted on the hinge unit 130 as shown in FIG. 1. When the demounting operation button 132 is operated in a sliding manner in the direction of an arrow A shown in FIG. 1, the engagement between the keyboard 140 and the hinge unit 130 is released and the keyboard 140 is demounted from the hinge unit 130 as shown in FIG. 3 by drawing the keyboard 140 in the direction of an arrow B shown in FIG. 1.

Figure 4:
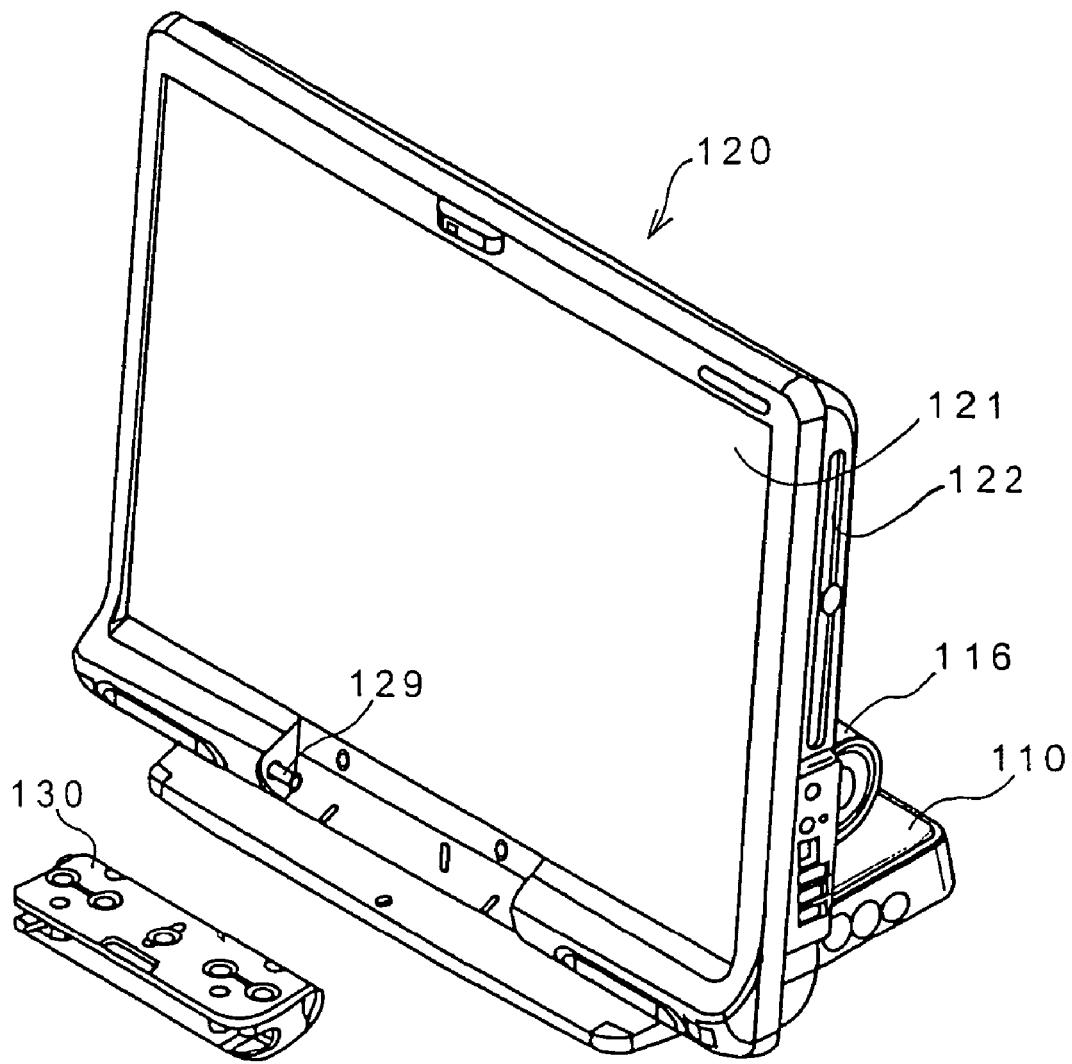
FIG. 4 is a perspective view of the hinge unit demounted from a standing section.

FIG. 4 is a perspective view of the hinge unit demounted from the standing section.

The hinge unit 130 is rotatably supported by a supporting shaft 129 provided in the standing section 120 and can rotate on the supporting shaft 129 to ensure that the keyboard 140 mounted on the hinge unit 130 can rotate between a closed position in which the keyboard 140 superposes the standing section 120 to cover the liquid crystal display screen 121 as shown in FIG. 2, and an open position in which the keyboard 140 opens from the standing section 120 to expose the whole area of the liquid crystal display screen 121 as shown in FIG. 1.

The hinge unit 130 is provided with a hinge-unit open/close detection switch 133 (refer to FIG. 1), which detects whether the hinge unit 130 is in an open position shown in FIG. 1 or in a closed position shown in FIG. 2, and also a keyboard detection switch 151 (not shown here), which detects whether the keyboard 140 is mounted on the hinge unit 130 as shown in FIG. 1 or the keyboard 140 is demounted from the hinge unit 130 as shown in FIG. 3. In the circuit on the circuit board incorporated in the hinge unit 130, in addition to the depression of the five one-touch buttons 131, the on/off operations of the hinge unit open/close detection switch 133 and the keyboard detection switch 151 are also detected.

Incidentally, the standing section 120 is provided with receiving sections 162 formed from an elastic body such as rubber (refer to FIG. 1). The receiving sections 162 flexibly receive the abutment by the hinge unit 130 when the integral-type PC is folded double as shown in FIG. 2.

A large number of keys (not shown) which receive key operations are arranged on the keyboard 140. In addition, the keyboard 140 is provided with an infrared transmitter 141 which sends key operation information and a suspend button 142 to wake this integral-type PC 100 from suspend mode. Key operation information sent from the infrared transmitter 141 of the keyboard 140 is received at an infrared receiver 128 provided in the standing section 120.

The mouse 150 is also provided with an infrared transmitter (not shown here) which sends operation information of the mouse 150, and the mouse operation information sent from this infrared transmitter is also received at the infrared receiver 128 of the standing section 120.

The keyboard 140 has a width (in the horizontal direction) almost equal to the standing section 120, but has a shorter depth as shown in FIG. 1 (the vertical direction in the closed position shown in FIG. 2) than the standing section 120. For this reason, in the closed position shown in FIG. 2, the keyboard 140 covers only part of the display screen 121 of the standing section 120, and even in the closed position shown in FIG. 2, about ⅓ portion of the upper region of the display screen 121 remains exposed.

Figure 5:
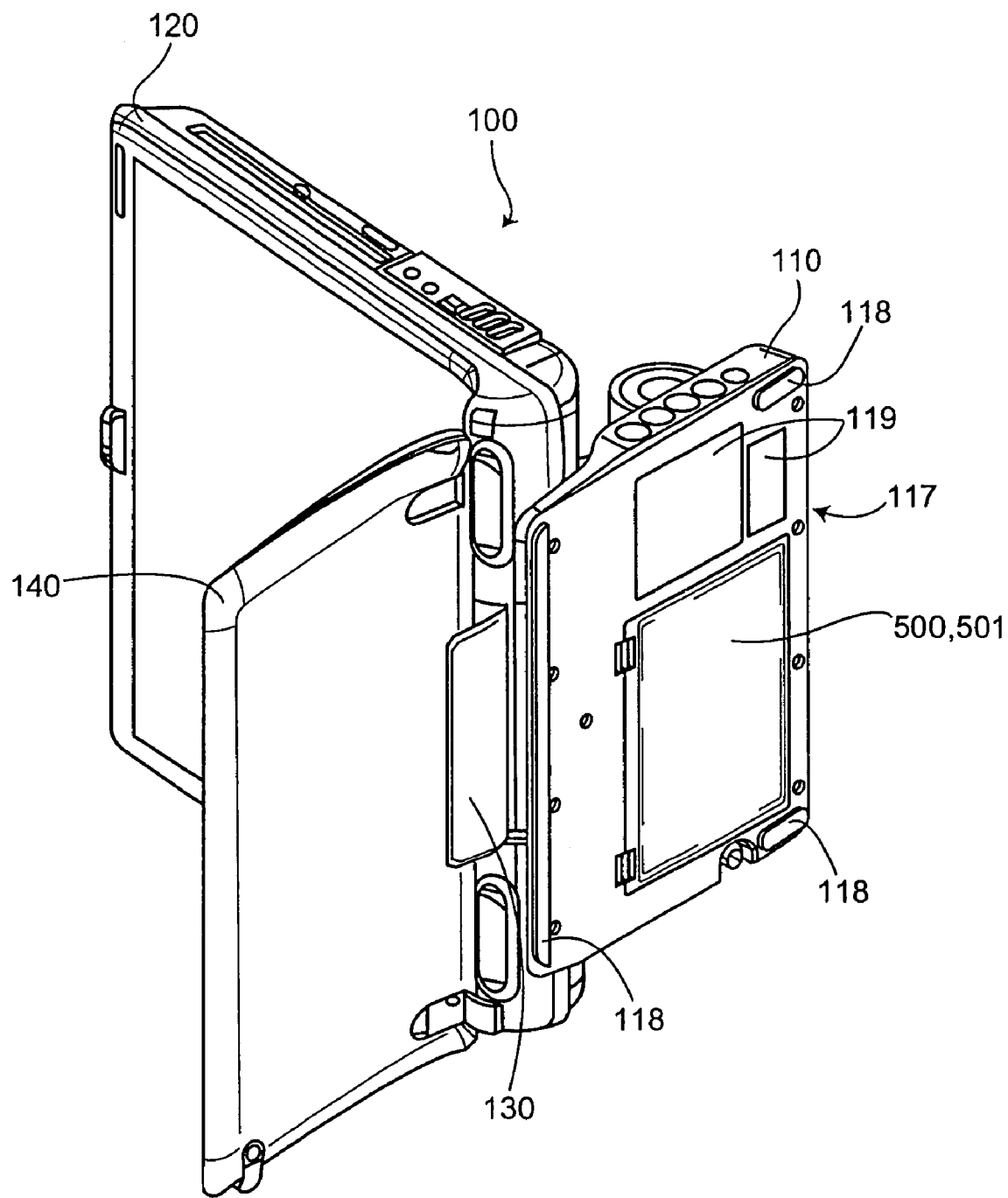
FIG. 5 is a perspective view showing the undersurface of a base section of the integral-type PC shown in FIGS. 1 through 4.

FIG. 5 is a perspective view showing the undersurface of the base section of the integral-type PC shown in FIGS. 1 through 4.

On the undersurface 117 of the base section 110, three cushion members 118 are disposed at respective positions and also labels 119 are attached thereon. The cushion members 118 are made from a material such as rubber and function as cushions when they are placed on a horizontal surface like the top of a desk. In the undersurface 117 of the base section 110, a battery pack 500 is loaded in such a manner that an undersurface 501 of the battery pack 500 is flush with the undersurface 117.

Figure 6:
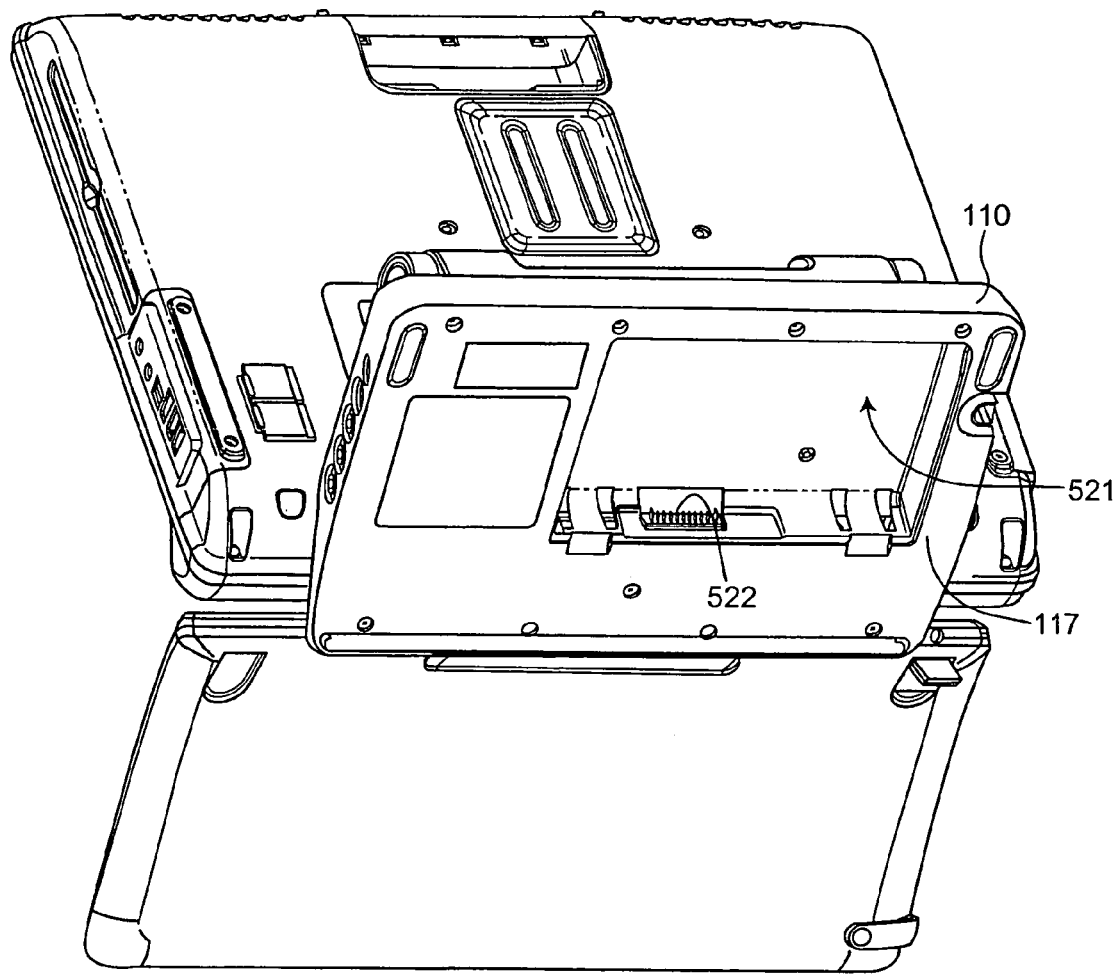
FIG. 6 is a perspective view showing the undersurface of the base section when a battery pack is removed.
Figure 7:
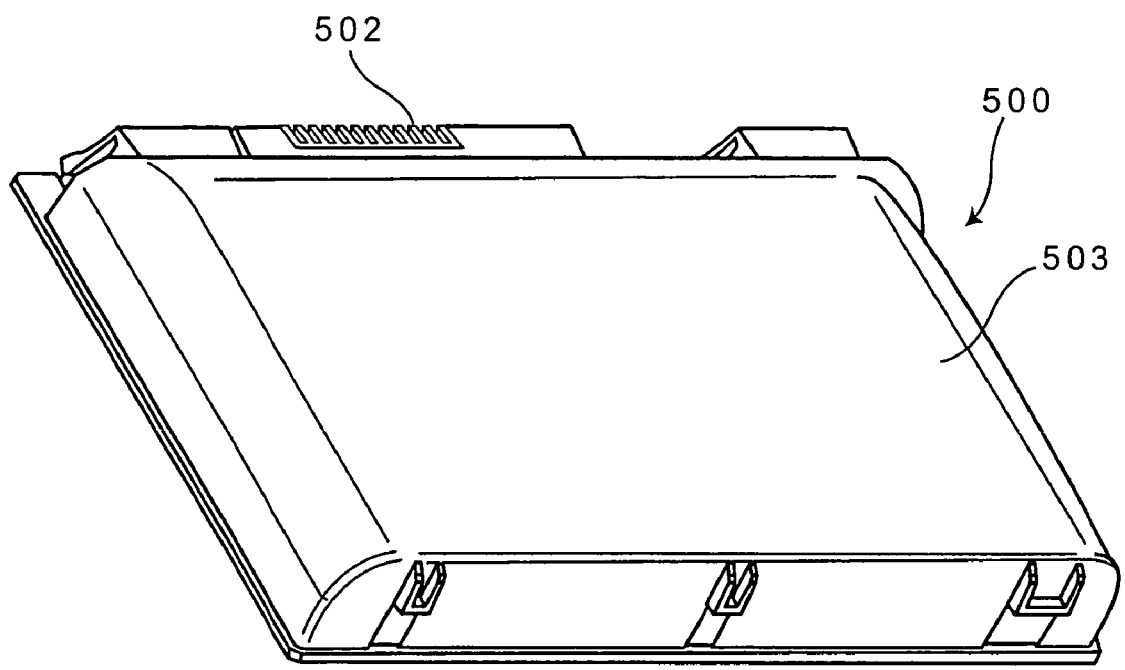
FIG. 7 is a perspective view of the battery pack.

FIG. 6 is a perspective view showing the undersurface of the base section when the battery pack is removed, and FIG. 7 is a perspective view of the battery pack.

In the undersurface 117 of the base section 110, there is formed a battery-pack storing section 521 that is a hollow on the undersurface 117. On a sidewall defining the battery-pack storing section 521, there is disposed an electric-contact section 522 for electrically connecting the battery pack and the internal circuit of the base section 110.

The battery pack 500 shown in FIG. 7 is so configured as to be loaded in the battery-pack storing section 521 with a top face 503 facing inside and to electrically connect an electric-contact section 502 of the battery pack 500 to the electric-contact section 522 of the battery-pack storing section 521.

The battery pack 500 is a component considerably heavy in weight. Therefore, the weight of the base section 110 is increased by loading the battery pack 500 in the base section 110 as shown in FIGS. 6 and 7 so that the integral-type PC can stably keep the posture by means of the base section 110. Further, because the base section is made considerably heavy in weight by loading the battery pack 500 in the base section 110, even if heavy components such as a CD/DVD drive and a hard disk are disposed on the back of the liquid crystal display screen 121, stability is maintained, operability is improved, and free arrangement of components is ensured. Furthermore, such an integral-type PC can be carried to anywhere desired and used by means of the battery pack 500 without depending on AC power.

FIG. 8 is a circuit block diagram of the integral-type PC 100 according to the embodiment that has been described so far.

A main unit 200 shown in FIG. 8 corresponds to a portion obtained by combining the base section 110 and the standing section 120 shown in FIGS. 1 through 7, and the main unit 200 is provided with a CPU 201, a RAM 202, a memory card controller 203, an audio controller 204, a TV tuner 205, a memory card 206, a liquid crystal display 207, a ROM 208, a modem card 209, a LAN controller 210, and a disk controller 211. The main unit 200 is also provided with the infrared receiver 128, the connector terminal 125 in conformity with IEEE 1394 Standard, and the connector terminal 126 in conformity with USB Standard also shown in FIG. 1, which are interconnected via a bus 220.

The CPU 201 is an element that performs various kinds of data processing by executing programs.

The RAM 202 is a memory in which programs executed at the CPU 201 are expanded for execution and which is used as a working memory during the execution of the programs in the CPU 201.

The memory card controller 203 is a controller that has access to the memory card 206.

The audio controller 204 is connected to a headphone output terminal 123, a microphone input terminal 124, and a speaker 127. The audio controller 204 serves to convert audio signals inputted from the microphone input terminal 124 into digital signals and incorporate the digital signals into the interior, and also serves to convert digital signals sent via the bus 220 into analog audio signals to send the analog audio signals to the speaker 127 and the headphone output terminal 123.

As described above, the infrared receiver 128 receives operating information of the keyboard 140 and the mouse 150.

The TV tuner 205 is connected to the antenna input terminal 112, the audio input terminals 113R and 113L, the S video input terminal 114 and the video input terminal 115 and serves as an element which performs TV broadcasting, video picture recording, playing back, etc.

The memory card 206 is a portable memory card capable of being freely inserted into this integral-type PC, for example, a memory stick, an SD memory card, etc. The memory card 206 can be accessed by the memory card controller 203.

The liquid crystal display (LCD) 207 is provided with the liquid crystal display screen 121 shown in FIG. 1 and serves to display various images on the liquid crystal display screen 121 according to instructions of the CPU 201.

The ROM 208 is a storage element that stores fixed data and programs.

The modem card 209 is an element that performs a kind of communication and is connected to a communication connector 216.

Also, the LAN controller 210 is an element that performs a kind of communication and is connected to a communication connector 217.

Furthermore, the disk controller 211 serves to access a hard disk 212 housed in the main unit 200 and a CD or DVD 213 loaded from the CD/DVD loading slot 122 shown in FIG. 1.

Furthermore, an AC adapter 310 is provided with an AC/DC converter 312 converting an AC current into a DC current and a plug socket 311 and is inserted into the AC adapter connection terminal 111. The main unit 200 is provided with the battery pack 500 and a DC/DC converter 215. When the AC adapter 310 is inserted into the AC adapter connection terminal 111 and power is supplied from the AC adapter 310, the battery pack 500 is charged with the supplied power and the DC/DC converter 215 generates DC power of multiple voltages from the supplied power and supplies the DC power to components of this integral-type PC which require power. When the supply of power from the AC adapter input terminal 111 is stopped, for example, when the AC adapter 310 is removed from the AC adapter connection terminal 111, the DC/DC converter 215 receives the supply of power from the battery pack 500. Therefore, this integral-type PC can work even without the AC adapter while power remains in the battery pack 500.

In the hinge unit 130 shown in the lower part of FIG. 8, a hinge unit circuit board 231 connected to the bus 220 is shown in addition to the one-touch button 131, the hinge unit open/close detection switch 133 and the keyboard detection switch 151 described above. This hinge unit circuit board 231 serves to operate the one-touch button 131 and to detect the on/off condition of the hinge unit open/close switch 133 and the keyboard detection switch 151 and transmit the result of the detection to the CPU 201.

Figure 9:
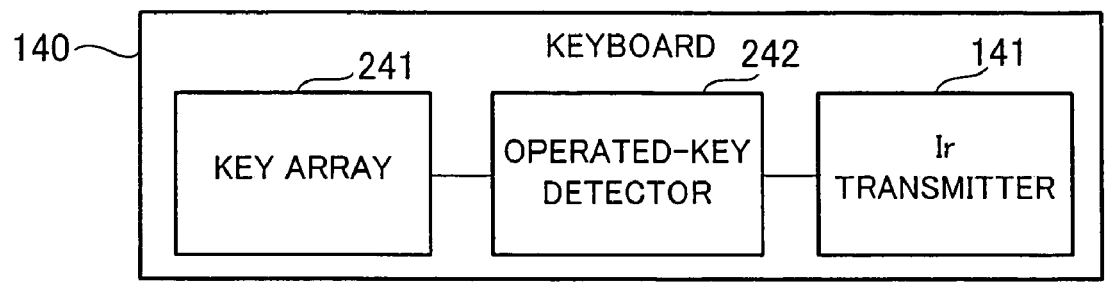
FIG. 9 is a circuit block diagram of the keyboard.

FIG. 9 is a circuit block diagram of the keyboard.

The keyboard 140 is provided with a key array 241 composed of many arrayed keys, an operated-key detector 242 which detects operations made on the key array 241, and an infrared transmitter 141 which sends key operation information detected by the operated-key detector 242. As described earlier, the key operation information sent from the infrared transmitter 141 is received by the infrared receiver 128 (refer to FIG. 8) of the main unit 200 and transmitted to the CPU 201.

Figure 10:
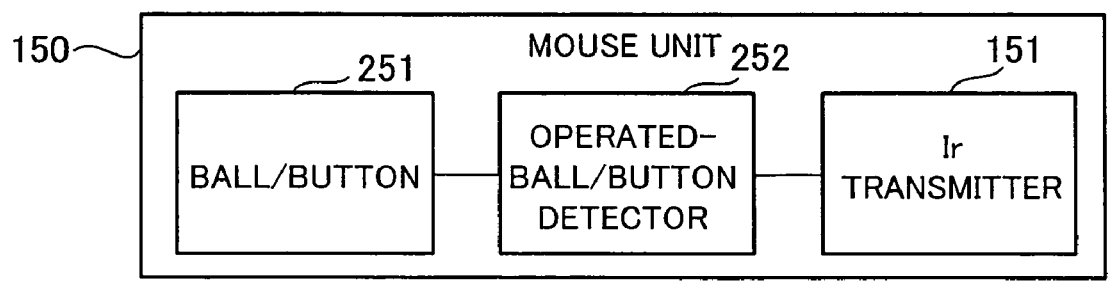
FIG. 10 is a circuit block diagram of a mouse.

FIG. 10 is a circuit block diagram of the mouse.

The mouse 150 is provided with a ball/button 215 as an operating member, and the operation of the ball and the button is detected by an operated-ball/button detector 252, and mouse operation information detected by the operated-ball/button detector 252 is sent from the infrared transmitter 151. As described earlier, the mouse operation information sent from the infrared transmitter 151 is received by the infrared receiver 128 of the main unit 200 (refer to FIG. 8) and transmitted to the CPU 201.

In the above description of the embodiment, an integral-type PC has been used as an example. However, the present invention is not limited to an integral-type PC and can be applied to various types of electronic apparatus having a base section, a standing section, and an open/close section like those described above.

The invention claimed is:

1. An electronic apparatus, comprising:
   a base section having a flat undersurface to be placed on a flat surface;
   a standing section standing on the base section, the standing section including a back surface, the base section extending behind the back surface of the standing section;
   an open/close section rotatably supported by the standing section and openable/closable with respect to the standing section, the open/close section extending in a direction opposite the base section when opened; and
   an electronic circuit incorporated therein,
   wherein the base section has a battery-pack storing section that stores a battery pack for supplying power to the electronic circuit,
   wherein the battery-pack storing section is formed as a hollow in an undersurface of the base section such that when the battery pack is loaded into the battery pack storage section the undersurface of the battery back is flush with the undersurface of the base section, and the battery pack is not visible when the base section is placed on the flat surface.

2. The electronic apparatus according to claim 1, wherein the standing section has a display screen on a front thereof, with respect to which the open/close section is adapted to be opened and closed.

3. The electronic apparatus according to claim 2, wherein the standing section is capable of adjusting an elevation angle of the display screen by being rotatably supported by the base section.

4. The electronic apparatus according to claim 2, wherein the standing section has an operational circuit disposed on a back of the display screen.

5. The electronic apparatus according to claim 2, wherein the open/close section is rotatably supported by the standing section between a closed position in which the open/close section superposes the display screen and an open position in which the open/close section is opened with respect to the display screen.

6. The electronic apparatus according to claim 1, wherein the open/close section is a keyboard having arrayed keys to receive manipulations of an operator.

7. An electronic apparatus, comprising:
   a base section to be placed on a flat surface;
   a standing section standing on the base section;
   an open/close section rotatably supported by the standing section and openable/closable with respect to the standing section; and
   an electronic circuit incorporated therein,
   wherein the base section comprises:
      a battery-pack storing section that stores a battery pack for supplying power to the electronic circuit, and a plurality of terminals provided on a side surface of the base section to connect external devices, other than the battery pack, to the electronic apparatus.

8. The electronic apparatus according to claim 7, wherein the plurality of terminals are disposed at a flank of the base section.

9. The electronic apparatus according to claim 7, wherein the base section further comprises a speaker disposed on a top thereof.

10. The electronic apparatus according to claim 7, wherein the battery-pack storing section is a hollow on an undersurface of the base section to be placed on the flat surface.

11. The electronic apparatus according to claim 7, wherein the undersurface is flush with the battery pack stored in the battery-pack storing section.

* * * * *